2,712,317
EYELASH CURLER
Charles M. Palmer, Washington, D. C.

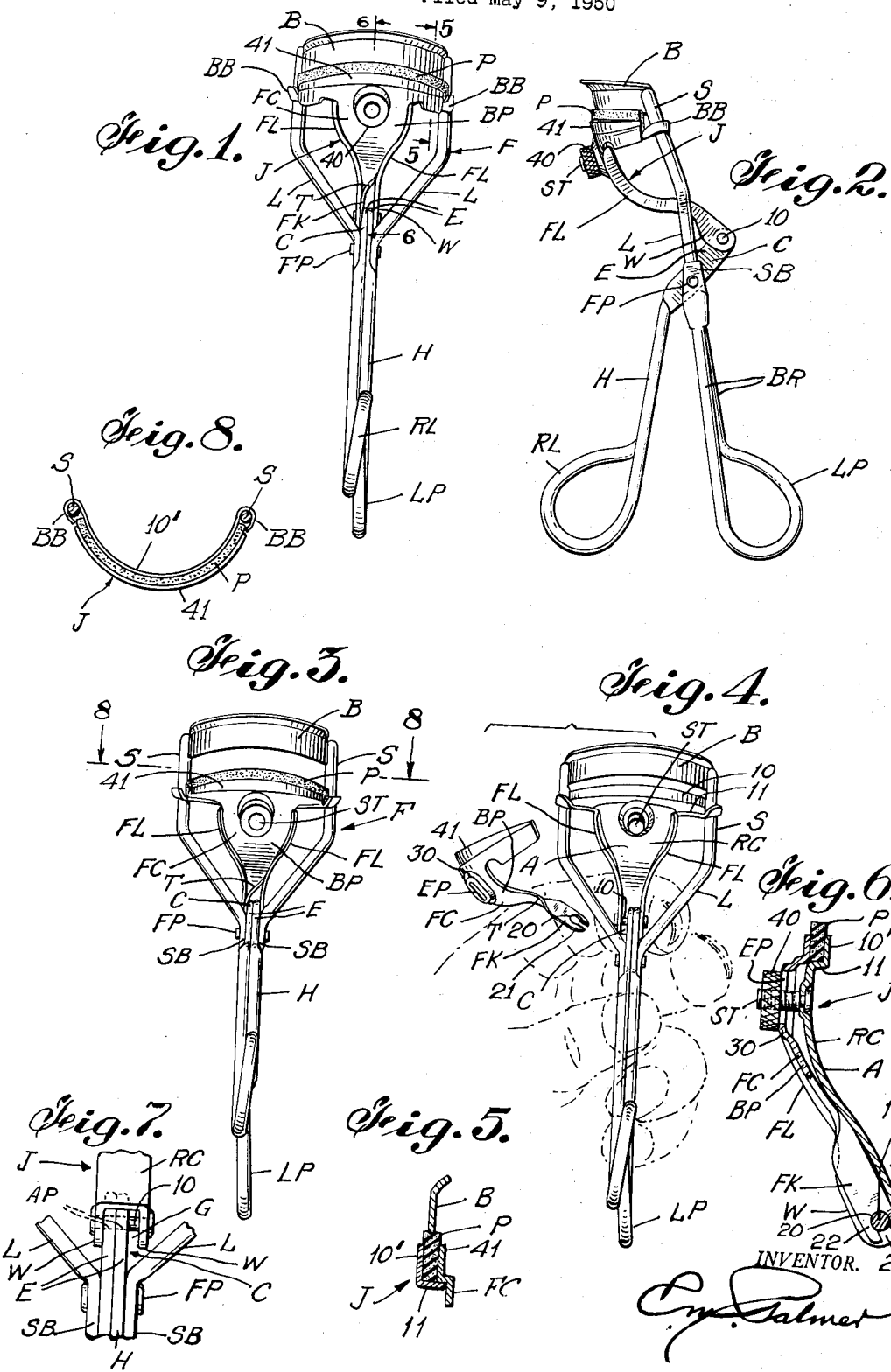

Application May 9, 1950, Serial No. 160,872

10 Claims. (Cl. 132—32)

This invention is directed to eyelash curlers and more particularly to the front component of a rubber pad clamping jaw having its rear component slidably guided by spaced vertical shanks of a wire frame to which a crank portion of an actuating handle is pivotally connected and also operatively associated with the rear component of the jaw to actuate the latter on displacement of the handle towards or away from an arcuate bar anchored to the upper portions of the shanks. Specifically hitherto the lower portion of the front component was pivotally retained against removal on a fulcrum pin carried by the crank, thus precluding complete access to the inside surfaces of both the front and rear components for cleaning. Also in production and particularly during stamping operations, slight increments in length occur in the front component due to variations in temper of the metal thus providing difficulties in assembly. The primary object is to removably mount the front component on the fulcrum pin pivotally sustaining the rear component by interrupting the offset tail portion of the front component with a slot leading to the lower edge of the tail portion and in communication with a semi-circular opening to define a fork constituted by a pair of spaced tines adapted to removably straddle the fulcrum pin received into the semi-circular opening characterizing a bearing pivotally retained on the fulcrum pin. As a further object the invention comprehends the utilization of a longitudinally shiftable pin displaceable relative to the crank to provide a relief gap between the crank and the rear component for conveniently removing the front component from the fulcrum pin or permit quick insertion of the front component in the rear component for prompt assembly. Other important functional and structural features of the invention will be readily understood from the teachings of the following detailed description taken with the accompanying drawings wherein:

Fig. 1 is a front elevational view of the eyelash curler according to my invention, showing the curler fully assembled, and closed.

Fig. 2 is a side view of Fig. 1.

Fig. 3 is a view similar to Fig. 1 showing the curler partly opened.

Fig. 4 is a view similar to Fig. 3 showing the front component removed from the longitudinal shiftable fulcrum pin.

Fig. 5 is a sectional view on the line 5—5 of Fig. 1.

Fig. 6 is an enlarged sectional view on the line 6—6 of Fig. 1.

Fig. 7 is a fragmentary and enlarged rear view of Fig. 4, illustrating the relief slot or gap defined by the crank and lower portion of the rear component of the pivoted jaw, and Fig. 8 is a horizontal sectional view on the line 8—8 of Fig. 3.

Illustrative of the embodiment disclosed, the eyelash curler comprises, the wire frame F, the fixed arcuate bar or jaw B, the pivoted handle H, the shiftable jaw broadly designated J, and the rubber pad or refill P.

Specifically bar B is anchored to the upper parts of the spaced shanks S of the frame having downwardly converging limbs L merging with spaced flat bearing SB carrying fulcrum pin FP on which crank C of the swingable handle H is pivotally retained between the spaced bearings SB merged with the depending contiguous branches BR defining finger receiving loop LP.

Jaw J comprises the rear component RC and the front component FC. More particularly rear component RC is a one piece sheet metal member having the arcuate upstanding rim 10', the horizontal seat 11, and the depending downwardly and rearwardly depending apron A having the forwardly projecting reinforcing side flanges FL.

Hollow bearings BB at the sides of the upper part of jaw J are slidably guided on shanks S while lower portion or rear compoennt RC includes the lower wings W widely straddling the juxtapositioned ends E constituting crank C of the wire handle H also including finger receiving loop RL.

Juxtapositioned ends or terminals E are provided with perforations AP to slidably receive fulcrum pin 10 extending through and upset closely outside of wings W (Fig. 7) of the rear component. By this connection, the lower part of jaw J is pivoted to crank C of the pivoted handle.

Of importance however is that this connection be considered as "loose" in that pin 10 slides relative to ends E, or in other words the lower part of the rear component RC may be shifted slightly relative to handle H to provide a clearing gap G whereby the lower bifurcated portion or fork FK may be quickly snapped onto fulcrum pin 10 permanently secured to wings W. Gap G is formed by a wing W and an adjacent end E of crank C.

Fork FK embodies the interrupted circular opening 20 in communication with slot 21 defined by tines 22 which are adapted to quickly and removably straddle the shiftable fulcrum pin 10 for reception of the latter into opening 20 which in fact constitutes a bearing rotatable on pin 10. Fork FK is substantially normal to the breast portion BP of the front component due to the twist T. This breast portion embodies boss 30 having the elliptical opening EP for removably receiving the external threaded stud ST anchored to apron A of the rear component.

Internally threaded wheel 40 cooperates with stud ST to pivotally shift the upper rim of the front component FC. In fact the front component may be considered as a pivoted clamp or retaining member for securing pad P in place on seat 11 and against the rear rim 10' after wheel 40 has been tightened.

Briefly recapitulating, apron A of the rear component may be considered a receptacle for removably receiving the front component which as previously stated may be quickly mounted on or removed from the longitudinally shiftable fulcrum pin or rivet 10. If removed complete access may be had to the inside surfaces of the rear component RC (Fig. 4) for cleaning. Also due to the fact that the tines 22 constitute a slot or gap for removably receiving pin 10, this gap together with opening or bearing 20 may be considered as having a loose pivotal association with pin 10, thereby compensating for any variations in length of the front component inherent during stamping the latter.

By the present arrangement, if the wheel be loosened slightly the refill or pad P can be quickly removed from the slidable jaw J, cleaned, and restored, or a new refill may be readily substituted or changed. Where however complete access is desired to the inside surfaces of the components, wheel 40 is unthreaded from stud ST and thereafter the front component or retaining member FC is lifted from slidable pin or rivet 10 to be completely out of the front component whose flanges FL and wings W (Fig. 7) extend forwardly and are in alignment although wings W loosely and widely straddle the upper ends E of crank C when the front component has been removed from the latter, thereby permitting bodily and lateral shifting of the lower part of rear component relative to crank C. However when the fork FK be interposed in gap G, namely, between the crank and one of the wings W, gap G is practically filled, precluding longitudinal displacement of pin or rivet 10 relative to the crank C although at this time the retaining member or front component FC is pivotally mounted on pin 10 on which the lower part of apron A is also pivoted.

Stud ST together with the removable wheel 40 may be considered as means coupling the front and rear components or members FC and RC together, each of which is fashioned out of sheet metal while frame F and the actuator or handle H is formed out of wire.

In the assembled relation of the curler, eyelashes inserted between pad P and bar B are quickly and enticingly curled by displacing the actuator or handle H towards the juxtapositioned branches BR, thus closing the curler. By such action handle H is pivoted relative to frame F. It follows that crank C is raised and consequently pin J is shifted upwardly towards bar B. To open the curler, handle H is tilted away from loop LP.

Copending application 18,040, now Patent No. 2,598,719, and 637,313, now Patent No. 2,598,718, are made of record herein.

Various changes may be made in details of construction and arrangement of parts without departing from the scope of the invention or sacrificing any of the advantages inherent therein.

I claim:

1. An eyelash curler adapted to utilize a resilient pad, comprising; a frame having spaced shanks, an arcuate bar fixed to said shanks, an arcuate jaw for supporting said pad and interposed between said shanks and having means slidably guided thereby and including a depending apron, actuator means provided with crank means having perforated means, means movably supporting said actuator means relative to said frame, pin means longitudinally and slidably guided by said perforated means and secured to said apron, a retaining member having a forked portion removably and pivotally mounted on said pin means, and means removably coupling said apron and retaining member for removably clamping said pad.

2. An eyelash curler adapted to utilize a resilient pad, comprising; a frame having spaced shanks, an arcuate bar fixed to said shanks, an arcuate jaw for supporting said pad and interposed between said shanks and having means slidably guided thereby and including a depending apron, actuator means provided with crank means having perforated means, means movably supporting said actuator means relative to said frame, pin means longitudinally and slidably guided by said perforated means and secured to the lower part of said apron, a retaining member having a forked portion including spaced tines removably mounted on said pin means, and means removably coupling said apron and retaining member for removably clamping said pad.

3. An eyelash curler adapted to utilize a resilient pad, comprising; a frame having spaced shanks, an arcuate bar fixed to said shanks, an arcuate jaw for supporting said pad interposed between said shanks and having means slidably guided thereby and including a depending apron having forwardly extending and spaced wings, actuator means provided with crank means having perforated actuator means, means movably supporting said actuator means relative to said frame, pin means longitudinally and slidably guided by said perforated means and secured to said wings, a retaining member having a lower forked portion removably and pivotally mounted on said pin means, and means coupling said apron and member for removably clamping said pad.

4. The curler according to claim 3 characterized in that said forked portion includes bearing means rotatable on said pin, and said wings widely straddle said crank means to provide for lateral displacement of the lower part of said apron bodily relative to said crank means after said retaining member is removed from said pin said lateral displacement of said apron relative to said crank means causing said pin to be longitudinally displaced, thereby defining a gap between said crank means and one of said wings to permit prompt insertion of said forked portion into said gap and on to said pin.

5. The curler according to claim 1 further characterized in that said retaining member has a tapered breast portion including an elliptical opening at its upper part and includes a twisted portion and a depending forked portion substantially normal to said breast portion.

6. A front component for clamping an eyelash curler pad, comprising; an upstanding longitudinally curved rim and a depending downwardly and rearwardly curved breast portion provided with a twisted terminal portion having a slot defining spaced tines.

7. The component according to claim 6 wherein said tines include spaced faces constituting in part a narrow portion of said slot.

8. The component defined in claim 7 further characterized in that said narrow portion merges with an enlarged part of said slot having a curved face constituting bearing means.

9. In an eyelash curler, actuator means provided with an opening at one end, a support having spaced parts defining a gap appreciably wider than said end and receiving the latter, a pin extending into said opening and bridging said gap but secured to said parts, said pin and opening constituting a pivoted connection, said pin being loosely guided in said opening to provide for slidable and longitudinal displacement thereof upon displacement of said support relative to said end, and a clamping member having a forked lower terminal removably straddling said pin.

10. The curler as specified in claim 9 wherein said end constitutes the upper part of a crank of said actuator means and characterizes stop means to limit displacement of said support laterally relative to said end.

References Cited in the file of this patent

UNITED STATES PATENTS

| | | |
|---|---|---|
| 2,159,912 | Squire | May 23, 1939 |
| 2,410,391 | Palmer | Oct. 29, 1946 |